Jan. 9, 1951 L. A. WILKINSON 2,537,110
CAMERA SHUTTER AND LENS MOUNT
Filed March 3, 1947 2 Sheets-Sheet 1

INVENTOR.
Leonard A. Wilkinson
BY
Strauch & Hoffman
ATTORNEYS

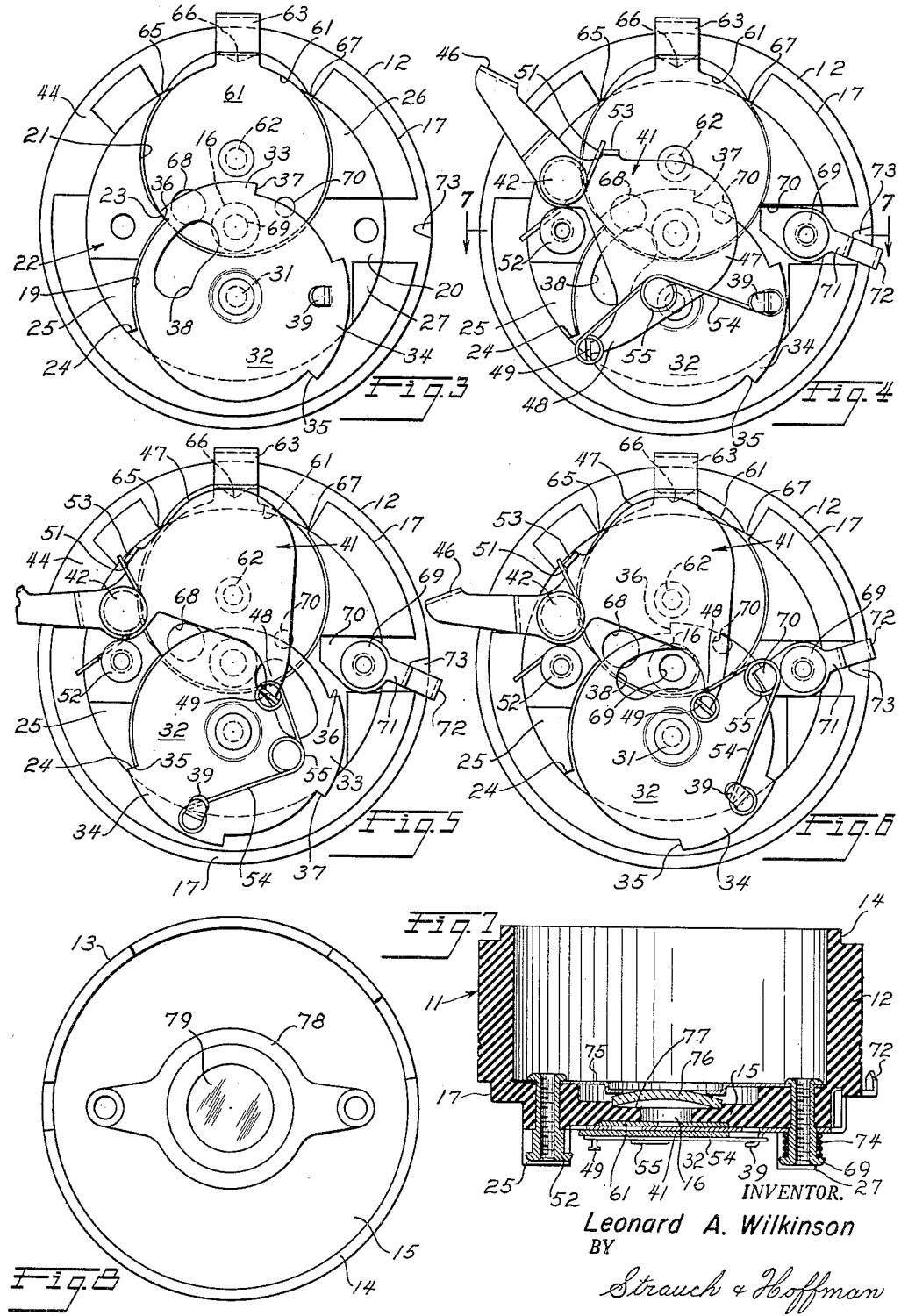

Patented Jan. 9, 1951

2,537,110

UNITED STATES PATENT OFFICE 2,537,110

CAMERA SHUTTER AND LENS MOUNT

Leonard A. Wilkinson, Ann Arbor, Mich., assignor to Argus, Incorporated, Ann Arbor, Mich., a corporation of Michigan Application March 3, 1947, Serial No. 732,111

3 Claims. (Cl. 95—60)

This invention relates to cameras and more particularly to a novel camera shutter and lens assembly which is compact, light tight, inexpensive and readily assembled.

It is the major object of the present invention to provide a novel shutter, diaphragm and lens tube assembly in a camera.

A further object of the invention is to provide a novel shutter and lens assembly so constructed and arranged as to provide adequate light trapping without recourse to felt gaskets, sealing compounds and the like in the camera.

It is a further object of the invention to provide a novel cover blade type of shutter and associated operating elements therefor adapted for taking instantaneous or time exposures in a camera.

A further object of the invention is to provide a novel association of shutter and variable aperture diaphragm plate mounted on a common internal wall in the lens tube of the camera.

Further objects of the invention will presently appear as the description proceeds in connection with the appended claims and the annexed drawings wherein:

Figure 3 is a front elevation of the lens tube of Figure 2 with the shutter trip lever removed to illustrate particularly the construction of the lens tube upon which the shutter parts and diaphragm are mounted;

Figure 4 is a front elevation of the lens tube with the cover removed and illustrating the shutter parts as they appear before an exposure is made;

Figure 5 is a front elevation of the lens tube illustrating the position of the trip lever and shutter parts after the trip lever has been depressed to its full extent with the time set lever set for an instantaneous exposure;

Figure 6 is a front elevation of the lens tube, illustrating the position of shutter parts and trip lever after the trip lever has been depressed to its full extent with the time set lever set for a time exposure;

Figure 7 is a section along line 7—7 of Figure 4 illustrating further the mounting of the parts on the lens tube; and Figure 8 is a rear view of the lens tube illustrating the manner of mounting the rear lens element of the front wall thereof.

Figure 1:
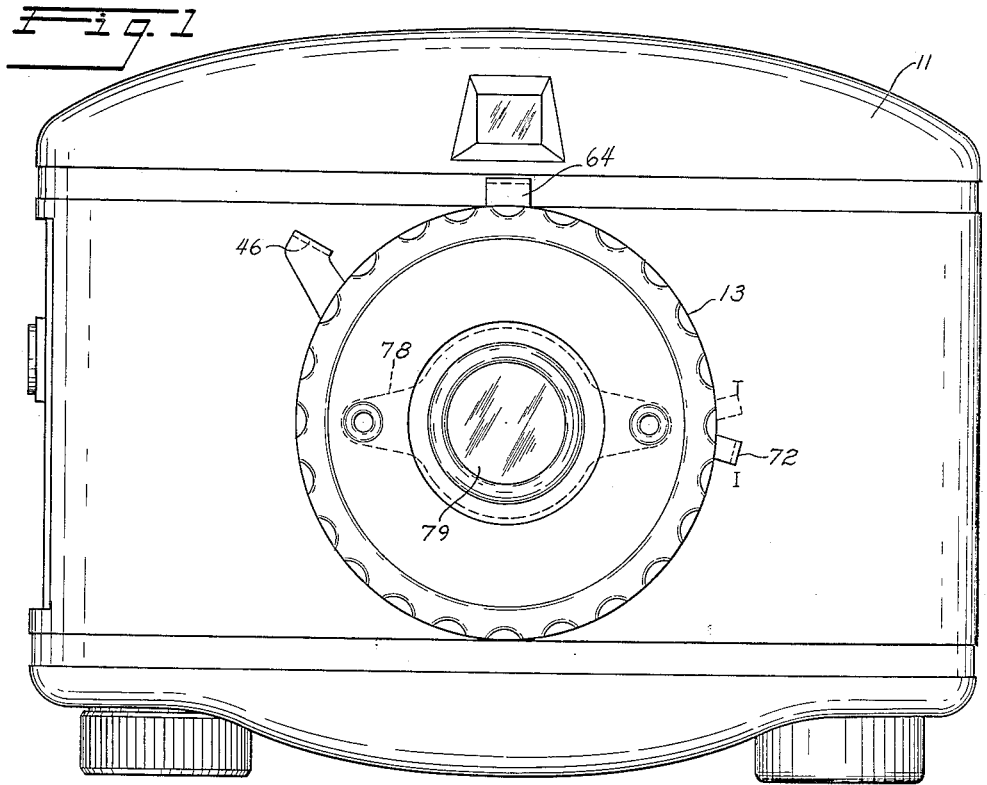
Figure 1 is a front elevation of a camera to which the preferred embodiment of my invention is particularly adapted.

According to a preferred embodiment of the invention, a camera 11, which is generally the same as that illustrated in United States Letters Patent No. 2,358,321, has mounted in its front wall a lens tube 12 having a front cover 13. Lens tube 12 is preferably an integral casting or molding, in the preferred embodiment being a molded tube of hardened opaque plastic like Bakelite, which is formed at its inner or rear end with a ledge 14 that fits into a suitable aperture in the camera to be there secured rigidly to the camera body.

At its front end, tube 12 is formed with an integral end wall 15 (Figure 7) formed at its center with a circular exposure aperture 16. A recessed shoulder 17 on the outer end of tube 12 provides a frictional seat for the cylindrical wall of cap 13, the cap being preferably made of spring metal so that when its open end is slipped over shoulder 17 it will frictionally grip lens tube 12.

Referring to Figure 3, wall 15 is formed with overlapping shallow arcuate-sided recesses 19 and 21 on its front surface, lower recess 19 being slightly less deep than recess 19 and formed with a radially extending portion 20 at one side. At the other side a forwardly extending integral abutment 22 is formed on wall 15 with its inner surfaces defined by arcs of recesses 19 and 21. Adjacent the intersection of those arcs is a stop face 23, the purpose of which will later be described, and at its lower end abutment 22 is formed with a second stop face 24, the purpose of which will also later be described.

Abutment 22 is formed above stop face 24 with a forward projection 25 that extends axially a distance sufficient to contact the bottom wall of the cover 13 when the latter is mounted on shoulder 17. Substantially diametrically opposite abutment 22 are two other forward projections 26 and 27 integral with wall 15 with their flat front surfaces in the same plane as the flat end of projection 25 and spaced circumferentially from each other by extension 20 of recess 19. These projections 25—27 all cooperate in locating cover 13 and protecting the shutter parts from contact with the cover.

Centrally of recess 19 is a rigid pivot pin 31 upon which is rotatably mounted a thin flat metal shutter plate 32 that is mainly circular but formed on its periphery with two radially extending segmental portions 33 and 34 providing radial stop faces 35, 36 and 37, the purpose of which will be explained. Plate 32 is formed with an arcuate elongated exposure aperture 38 and substantially diametrically opposite the exposure aperture has a portion thereof cut and bent up to form a spring anchoring tab 39.

A manual shutter trip lever 41 is pivotally mounted on a pivot pin 42 rigid with abutment 22. The outer end of lever 41 is bent rearwardly at 43 to pass through a recess 44 in shoulder 17, then radially outwardly at 45 and then rearwardly at 46 to provide a finger button for the operator. Lever 41 is a thin metal plate formed to the required shape. On the other side of pivot 42 trip lever 41 is formed with an enlarged shutter cover portion 47 that terminates in an arcuate tip 48 having its end turned up at 49 to provide a spring anchor tab. Pivot pin 42 is surrounded by a coil spring 51 anchored at one end on a rivet stud 52 rigid with abutment 22. Spring 51 bears at its other end on a tab 53 integral with trip lever 41. Spring 51 normally tends to urge lever 41 clockwise about pivot 42, so that when finger button 46 is released lever 41 always tends to maintain or return to the position of Figure 4.

Trip lever 41 and shutter plate 32 are interconnected by a light hair pin type spring 54 which is provided with an intermediate coil 55 and is affixed at its opposite ends to tab 39 of shutter plate 32 and end tab 49 of trip lever 41 respectively. In the position illustrated in Figure 4, since spring 51 is the stronger, spring 54 urges shutter plate 32 counterclockwise so that stop face 36 contacts abutment face 23. This is the normal starting and inoperative position of the shutter. During the period that the parts are in the position illustrated in Figure 4, shutter plate 32 covers aperture 16 and in addition the cover 47 of trip lever 41 is disposed in substantial axial alignment with exposure aperture 16 so as to prevent any light from reaching the film.

Centrally of deeper recess 21 and rearwardly of shutter plate 32, a diaphragm stop plate 61 is pivotally mounted on a fixed pivot pin 62. Plate 61 is formed with an integral radial arm 63 that is bent rearwardly at 64 to provide a latch coacting with three spaced indentations 65, 66, and 67 formed in a periphery of shoulder 17. Outside the lens tube, arm 63 is formed with a finger tab 60. Diametrically opposite arm 63 is a series of circular apertures 68, 69 and 70 of different size, each being adapted to be registered with exposure aperture 16 when the spring latch 64 is located in one of recesses 65, 66 and 67. Tab 60 coacts with suitable index marks on the outside of the lens barrel. Thus by rotation of plate 61 is it possible to select three different size aperture openings for the camera. Stop plate 61 is thus disposed in a shallow planar recess at a level close to but below the plane of shutter plate 32 and may rotate freely without interfering with operation of the shutter.

Diametrically opposite stud 52 is a second and similar stud 69 on which is pivoted a time set lever 71 that is formed with an integral spring arm extension 72 cooperating with a projection 73 on shoulder 17 to locate arm 71 either in the position of Figure 4 or the position of Figure 6. The position of lever 71 in Figure 4 is used when the camera is desired to be used for taking instantaneous exposures, and the position of Figure 6 is used when the camera is desired to take time exposures. A coil spring 74 surrounds stud 69 for maintaining the lever 71 under tension so that it may not be accidentally disturbed from the given setting.

Figure 2:
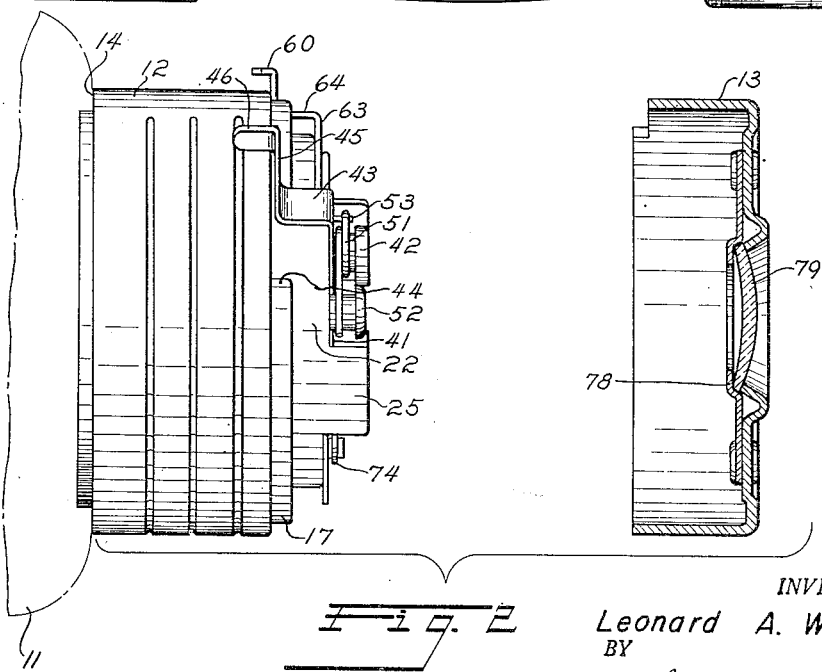
Figure 2 is a side elevation of part of the camera of Figure 1, illustrating particularly the lens tube with the shutter parts mounted on the front end thereof and with the cover which carries the front lens element spaced therefrom for clarity of disclosure.

Referring now to Figure 7, the inner ends of diametrically opposite studs 52 and 69 extend through wall 15 and at their inner ends are riveted over after extending through apertures in outwardly extending flanges of a lens retainer plate 75 which clamps the rear objective lens element 76 in a suitable shoulder 77 on the back of wall 15 in alignment with exposure aperture 16. A similar lens holder 78 (Figure 2) on cover 13 holds the front lens element 79 of the objective in line with exposure aperture 16.

Operation

With the parts in the position of Figure 4, wherein lever 71 is set for an instantaneous exposure and plate 61 is set for registration of medium aperture 69 with exposure aperture 16, the operator sights through the view finder of the camera and presses down on trip lever button 46. This rotates lever 41 counterclockwise against the power of spring 51 toward the position of Figure 5. After lever 41 has rotated a predetermined distance, sufficient to remove cover blade 47 from alignment with exposure aperture 16, the resilient interconnection between the shutter trip lever 41 and shutter plate 32, which consists of shutter spring 54, becomes effective to cause clockwise rotation of shutter plate 32 from the position of Figure 4 to the position of Figure 5 where the parts remain as long as the operator holds down button 46.

As lever 41 rocks counterclockwise, spring 54 is tensioned while its ends approach each other, and when its ends pass each other spring 54 is released to thereby snap shutter plate 32 swiftly to the position of Figure 5. During this rotation of plate 32 the aperture 38 traverses exposure aperture 16, thereby admitting image light for a brief period through the lens tube for exposing the film. The exposure duration is determined by the arcuate length of slot 38 and the speed of rotation of plate 32. This clockwise rotation of plate 32 is stopped by contact of face 35 of the shutter plate with abutment stop face 24 as illustrated in Figure 5. The exposure is now complete.

As soon as the operator releases button 46, spring 51 returns shutter trip lever 41 to the position of Figure 4. Trip lever first rotates clockwise sufficiently to place cover blade 47 in front of exposure aperture 16 and then tensioned spring 54 travels over its dead center again to reverse rotation of shutter plate 32 to thereby quickly return the parts to the position of Figure 4 where shutter plate 32 is again stopped by abutment stop face 23. Since cover blade 47 is over aperture 16, no light passes to lens 77 when the aperture 38 returns past aperture 16.

When it is desired to take a time exposure, time set lever 71 is rotated to the opposite side of the projection 73, whereby the flat nose 70 of lever 71 is disposed in the path of radial face 37 of the shutter plate. Thus when the operator presses down on button 46 of the shutter trip lever and the latter rotates counterclockwise as above described, tension and release of spring 54 causes sequential clockwise rotation of shutter plate 32 as in the case of instantaneous exposure, but instead of plate 32 rotating until surface 35 has contacted face 24, rotation of shutter plate 32 is stopped by engagement of face 37 with stop nose 70 of the time set lever. The shutter plate 32 is thereby stopped with aperture 38 located in alignment with exposure aperture 16 as in Figure 6, and will be held there as long as the operator continues to push down on button 46. By this time as in instantaneous exposures the cover blade 47 has been removed from alignment with the exposure aperture and picture light passes to the film. When the exposure period is over, the operator simply removes his finger from button 46 and the parts return to the position of Figure 4, the return operation being substantially as in the instantaneous exposure except that shutter plate 32 does not rock through the same angular distance.

I have provided an inexpensive and easily assembled camera wherein all of the light control parts are mounted in a novel manner on a single wall at the outer end of the lens tube and are readily accessible for repair, replacement and adjustment. The shutter parts are light-weight and readily inspected, and being inexpensive, they are readily replaced.

The nested arrangement of the shutter, cover blade and diaphragm plate on the integral front wall of tube 12, which is light tight where it is joined to the camera at 14, efficiently accomplishes adequate light trapping without recourse to gaskets and sealing compounds. This also makes assembly less difficult and less expensive.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Photographic apparatus comprising a lens tube having its open rear end formed to interfit in light tight assembly with the front of a camera and an integral front closure wall formed with an exposure aperture, a lens mount recess in the rear surface of said wall and a lens secured in said recess across the rear of said aperture, shallow overlapping recesses in different planes in the front surface of said wall, said aperture opening through the inner of said recesses, a diaphragm plate pivotally mounted in said inner recess and formed with a series of different sized apertures adapted to register with said exposure aperture, a shutter plate pivotally mounted in said outer recess with a portion overlapping said diaphragm plate, said shutter plate being formed with an exposure opening, a cover blade pivoted on said wall in overlapping relation to said recesses, a spring energized by initial movement of said cover blade interconnecting said shutter plate and cover blade, said energized spring acting to swing said shutter plate about its pivot after the cover blade has been moved a predetermined amount, a trigger projecting from said cover blade externally of said lens tube, a cover fitting over the front end of said tube for housing the shutter mechanism on said wall, and a lens on said cover in alignment with said aperture.

2. Photographic apparatus comprising a camera lens tube having an integral apertured front wall, a shallow recess in said front wall, a shutter plate pivotally mounted in said recess, a pivoted cover blade mounted on said wall and having a part overlying said recess, a spring interconnecting said cover blade and said shutter plate, a radial stop face on said shutter plate, a stop on said lens tube cooperating with said stop face to determine the normal location of said shutter plate, means on the back of said wall for securing a lens over said aperture, and a cover member carrying a front lens in alignment with said aperture removably mounted on said tube at said front wall.

3. In a camera, a lens tube having on open rear end interfitted with the front of the camera and an integral front transverse wall formed with an exposure aperture, spring connected shutter and cover blades pivoted on the front surface of said wall with said shutter blade being disposed in a similarly shaped shallow recess below said surface, a rear lens seated in a recess in the back of said wall in alignment with said aperture, a lens retainer plate secured to said wall and holding said lens on its seat, a cover removably mounted on the front end of said tube to protect said shutter mechanism, and a front lens on said cover in alignment with said aperture.

LEONARD A. WILKINSON.

REFERENCES CITED

The following references are of record in the file of this patent:

UNITED STATES PATENTS

| Number | Name | Date |
| --- | --- | --- |
| 512,601 | Carlton | Jan. 9, 1894 |
| 834,812 | Klaiber | Oct. 30, 1906 |
| 2,021,765 | Billing | Nov. 19, 1935 |
| 2,029,476 | Githens | Feb. 4, 1936 |
| 2,053,513 | Blattner | Sept. 8, 1936 |
| 2,199,998 | Hutchison | May 7, 1940 |
| 2,206,532 | Galter | July 2, 1940 |
| 2,271,562 | Lotz | Feb. 3, 1942 |